Sept. 26, 1967  W. H. WHITE, JR  3,343,791
REGULATING SYSTEM
Filed May 24, 1965

INVENTOR.
William H. White Jr.
BY
ATT'YS.

United States Patent Office 3,343,791
Patented Sept. 26, 1967

3,343,791
REGULATING SYSTEM
William H. White, Jr., Wheaton, Ill., assignor to Motorola, Inc., Franklin Park, Ill., a corporation of Illinois
Filed May 24, 1965, Ser. No. 457,941
2 Claims. (Cl. 236—1)

ABSTRACT OF THE DISCLOSURE

This device includes a transistor amplifier having an output that is coupled to a servo mechanism for operating regulating apparatus controlling the amount of cold and warm air introduced into an enclosure. First and second temperature sensitive resistors are coupled to the amplifier and bias the same to regulate the output. One temperature sensitive resistor is located exteriorly of the enclosure for sampling the ambient temperature. The other resistor is located in the enclosure adjacent an opening in an air duct that is connected to the air intake side of the regulating apparatus so that pure air is drawn over the resistor when air is drawn directly into the apparatus.

---

Figure 1:
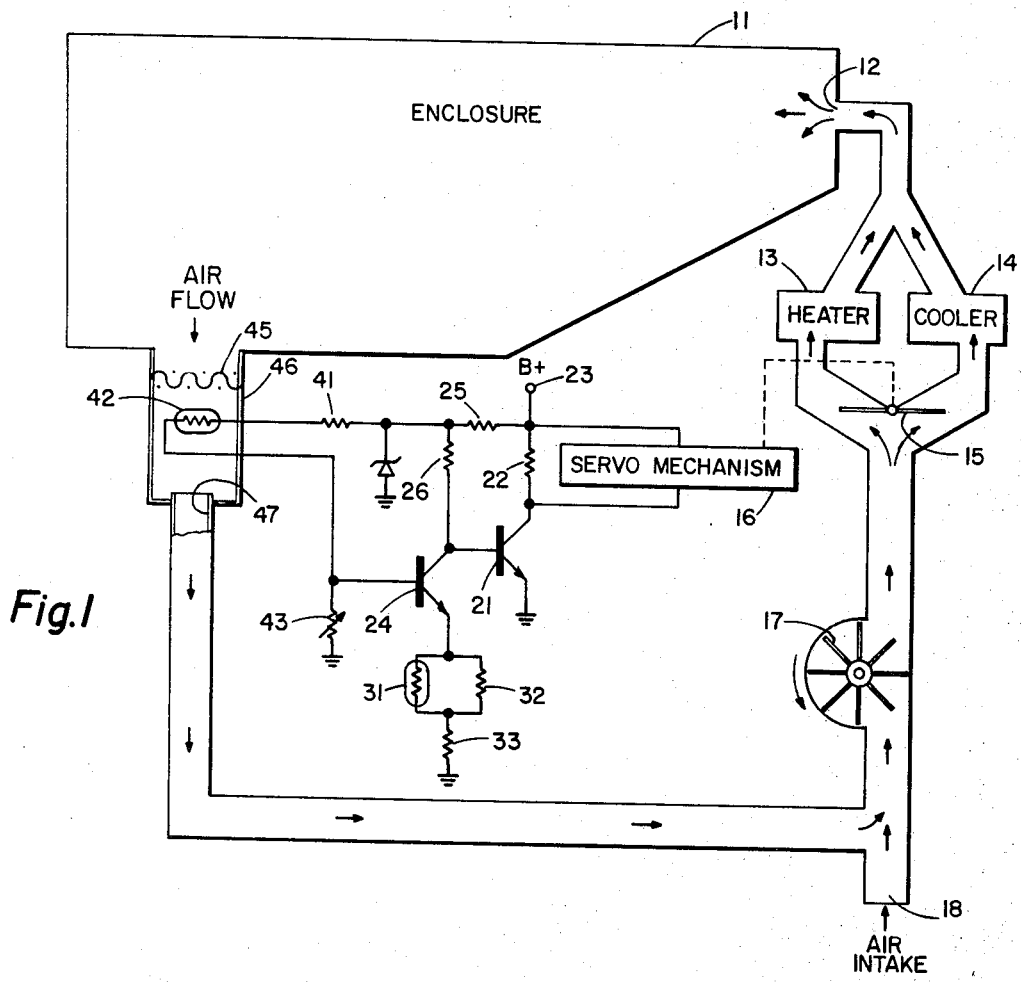

This invention relates to temperature regulating systems for enclosures such as the passenger compartment of an automobile, and more particularly to an improved control system for temperature regulating apparatus.

Temperature regulating systems for enclosures such as the passenger compartment of an automobile may include means for sensing the temperature in the enclosure and controlling the relative amounts of warm and cool air entering the enclosure to thereby regulate the enclosure temperature. The temperature outside the enclosure may also be sensed to provide a measure of the heat loss or gain resulting from the difference in inside and outside temperatures. Many such systems incorporate temperature sensitive resistors or thermistors having either positive or negative temperature coefficients, or both, in order to vary the output of a control circuit in a desired manner for controlling temperature regulating apparatus which heats and cools the air being forced into the enclosure. It is desirable from a cost standpoint to utilize all negative temperature coefficient (NTC) thermistors rather than positive temperature coefficient (PTC) thermistors because of the generally lower unit cost of the former. A drawback with NTC thermistors, however, is that their response is not as great to changes in temperature as is the response of PTC thermistors and consequently considerable gain may be necessary in sensing this change. in order to control the regulating apparatus. This may add expense and unnecessary complication to the temperature regulating system. Furthermore, because of the high sensitivity necessary, some systems may exhibit instability.

Accordingly, it is an object of this invention to provide an improved temperature regulating system.

Another object of the invention is to provide a control system for temperature regulating apparatus which is stable of operation and low in cost.

Still another object of the invention is to provide a control system for temperature regulating apparatus which is simple of operation and utilizes all NTC thermistors.

A feature of the invention is the provision of a control system utilizing a semiconductor device having an exterior temperature sensing thermistor in series with its main current path and an interior temperature sensing thermistor in series with its control current path. This may be provided by a transistor having an exterior temperature sensing thermistor in its emitter circuit and an interior temperature sensing thermistor in its base circuit.

Still another feature of the invention is the provision of a control circuit having an interior temperature sensing thermistor mounted proximate an open end of a duct connected with the air intake of the temperature regulating apparatus such that it is disposed in an air flow of interior temperature air.

Figure 2:
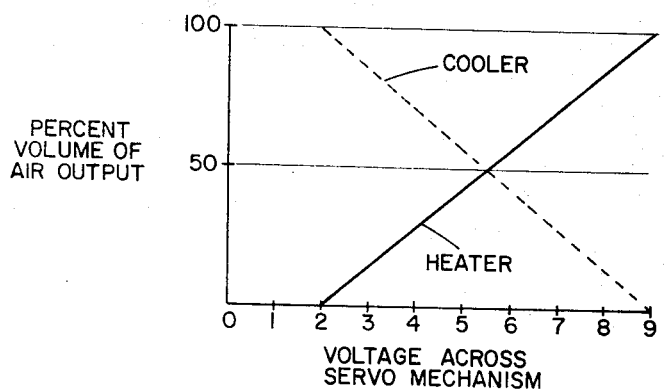

In the drawing:

FIG. 1 is a schematic diagram of a temperature regulating system constructed in accordance with the invention; and FIG. 2 is a graph illustrating the operation of the servo mechanism of FIG. 1.

The invention provides a control system for temperature regulating apparatus for regulating the temperature of an enclosure according to the magnitude of a control voltage applied by the control system to such apparatus. The system includes an amplifier comprising a semiconductor device having a main current path and a control current path. The semiconductor device is responsive to variation of current in the control current path to vary the current in the main current path. The amplifier is responsive to the magnitude of current in the main current path to apply a control voltage which varies therewith to the temperature regulating apparatus. A first temperature sensitive resistor and a variable resistor are series connected across a source of potential. The junction of the first temperature sensitive resistor and the variable resistor is connected to the control current path and the first resistor is disposed interiorly of the enclosure for varying the current in the control current path and hence in the main current path of the semiconductor device in accordance with the temperature in the enclosure. A second temperature sensitive resistor is series connected with the main current path across the source of potential. The second temperature sensitive resistor is disposed exteriorly of the enclosure for varying the current in the main current path in accordance with the temperature exteriorly of the enclosure. Thus, the first and second temperature sensitive resistors provide control of the regulating apparatus in accordance with exterior and interior temperature.

Referring now to FIG. 1, a schematic diagram of a temperature regulating system for controlling the temperature in an enclosure 11 is shown. The enclosure 11 might be, for example, the passenger compartment of an automobile. The system includes temperature regulating apparatus comprising a duct 12 through which air enters the enclosure 11. The temperature of the air entering enclosure 11 through duct 12 is determined by the relative air flow passing through heater 13 and cooler 14 of the regulating apparatus. These units may be any type of heating and cooling units, respectively, which are known in the art and which are adapted for the particular environment in which they are to be used. The relative amounts of air which pass through heater 13 and cooler 14 are determined by the angular position of a valve 15. Valve 15 is rotatable to a number of different positions by a simple servo mechanism 16 such that the relative percentages of the total amount of air being expelled through duct 12 which is passed through heater 13 and cooler 14 may be controlled with accuracy. The air flow through the temperature regulating apparatus is maintained by a fan 17 which draws air through an air intake 18.

Servo mechanism 16 is designed to position the valve 15 according to the voltage which is applied to the servo mechanism. Servo mechanism 16 might be a spring biased solenoid, a pressure modulation device, or any suitable device which is capable of operating valve 15 in accordance with impressed voltage FIG. 2 shows an example of the voltages which might be necessary to control the servo mechanism for a given percentage volume of air output. For example, with only two volts applied across the servo mechanism, the position of valve 15 is such that 100% of the air being drawn through intake 18 is passed through cooler 14 and none through heater 13. At the opposite extreme with 9 volts across the servo mechanism, 100% of the air is passing through heater 13, and none through the cooler 14. With about 5½ volts across the servo mechanism, the position of valve 15 is such that each of heater 13 and cooler 14 is handling 50% of the total air flow to provide equal parts heating and cooling. It may be desirable to provide temperature responsive switches for sensing exterior temperature to shut off the cooler in cold weather and the heater in hot weather. With one of the cooler or heater off, the duct associated therewith would pass air at the exterior temperature. It will be apparent, therefore, that the temperature of the air entering enclosure 11 through duct 12 may be controlled in accordance with the relative amounts or percentages of air volume passing through heater 13 and cooler 14.

Control systems for operating servo mechanisms such as servo mechanism 16 generally incorporate temperature sensitive resistors to control the output of an amplifier driving the servo mechanism. In addition to sensing the temperature of the interior air in the enclosure, it is also desirable that the exterior temperature or ambient temperature be also sensed and used in the control system. The purpose of the ambient sensor or exterior sensor is to shift the in-car temperature which the regulating apparatus is trying to maintain to slightly above or below the desired set temperature depending on whether the outside ambient temperature is below or above the interior temperature. For example, an increase of outside ambient temperature would cause a decrease of in-car temperature. A decrease of outside ambient temperature would cause an increase of in-car temperature. The ambient sensor is intended to compensate for variation in the rate of heat loss of the enclosure so that it reduces the excursions of interior temperature from the normal or desired setting. To attempt to control interior temperature by relying solely on the sensing of the interior temperature would require a sensitivity of such a magnitude as to make the system highly unstable.

Since the exterior sensor is subject to much greater variations in temperature than the interior sensor, it should be connected to the amplifier in such a manner that the amplifier is not as sensitive to the resistance changes of the outside sensor as it is to the resistance changes of the interior sensor. Since the interior sensor is not subject to wide variation it should have a greater affect on the system in response to variation in its temperature. Most positive temperature coefficient resistors exhibit a greater change of resistance per degree temperature change than NTC devices and consequently it may be desirable to use a PCT resistor as the interior sensor. Such devices, however, are often expensive. Where NTC resistors are used, it is generally necessary that the amplifier be designed in such a manner as to exhibit high gain or sensitivity to the smaller resistance changes exhibited by the NTC resistor. This may introduce some instability and even oscillation into the system. Furthermore, where it is desired to utilize all NTC devices, it is desirable that the interior sensor be relatively isolated electrically from the exterior sensor so as not to be affected by the high change in resistance of the exterior sensor. For example, were the two temperature sensitive resistors connected in series with each other in a voltage divider, a substantial change in resistance of the exterior sensor would change the current flow in the voltage divider to such an extent that the amplifier would be affected because of the change in voltage drop across the interior sensor, even though the interior sensor had not changed its actual resistance. The circuit of the invention eliminates the mentioned difficulties and provides improved and stable operation.

The servo mechanism 16 is driven by a transistor 21 which is of the NPN type. A load resistor 22 connects the source of B+ potential 23 with the reference potential in series with the collector to emitter path of transistor 21. The base of transistor 21 is connected to the collector of transistor 24, and biasing resistors 25 and 26 connect the source of B+ potential 23 to the base of transistor 21 and the collector of transistor 24.

Ambient or exterior temperature sensing in the system of the invention is accomplished by NTC resistor or thermistor 31 which is connected in parallel with a fixed resistor 32 to the emitter of transistor 24. A fixed resistor 33 connects the parallel combination of NTC thermistor 31 and fixed resistor 32 to the reference potential. It will be seen, therefore, that assuming a given level of conduction for transistor 24, an increase in the resistance of thermistor 31 due to a decrease in ambient temperature will cause the base of transistor 21 to become more positive, forcing the transistor toward saturation and increasing the voltage drop across resistor 32. This will apply a higher voltage to the servo mechanism and cause a greater percentage of the air being expelled from duct 12 to be passed through heater 13. The opposite action will occur with a rise in ambient temperature and the consequent reduction in the resistance of thermistor 31.

Resistor 25 is series connected with resistor 41, interior sensor or thermistor 42, and variable resistor 43, to form a voltage divider. The base of transistor 24 is connected to the junction between thermistor 42 and the resistor 43. Resistor 43 is variable to enable and occupant of the enclosure to set the particular temperature level desired by setting the level of operation of transistor 24. Resistor 43 may be operated by a convenient single control (not shown) which is calibrated to temperature level settings. Thermistor 42 senses the interior temperature and changes the voltage level on the base of transistor 24. Thus as the interior temperature falls with a resulting increase in the resistance of thermistor 42, the voltage across the servo mechanism 16 will increase because the base of transistor 24 becomes more negative, reducing conduction of transistor 24 and consequently increasing conduction of transistor 21. The opposite occurs if the temperature in the enclosure 11 increases.

Although it can be said that thermistor 31 and thermistor 42 are in series with the base to emitter path of transistor 24, the normal current through such a circuit in a transistor is so small that the affect of ambient sensor 31 on interior sensor 42 is negligible. The main current flow through resistor 42 is controlled by the current flow through resistor 43. Consequently, thermistors 31 and 42 are effectively isolated electrically. The amplifier comprised of transistor 24 and transistor 21 is considerably more sensitive to changes in thermistor 42, and yet is stable because the thermistor 31 is in the emitter circuit of transistor 24 and hence has a susbtantially lower affect on the operation of the amplifier. In other words, the affect of thermistor 31 is being amplified only by the transistor 21 whereas a higher gain is given to the affect of thermistor 42 because of the amplification in transistor 24 as well as transistor 21.

The response time of a temperature regulating system is a function of the response time of the sensors it employs to sample the interior temperature, for example, the response time of thermistor 42 in the system shown. Often such thermistors are given a protective coating which increases the response time of the device. In order to lessen the response time of thermistor 42, a flow of interior air is established around the thermistor. This is done by mounting thermistor 42 behind a grill 45 of non-heat conductive material in a chamber 46 which opens on to the enclosure 11. Immediately behind the thermistor 42, an air flow duct 47 is mounted. The other end of duct 47 is connected to the air intake 18 side of fan 17. This provides a flow of interior air around thermistor 42, which lowers the response time thereof and thereby tends to damp the excursions or hunting of the regulating system.

It may therefore be seen that the invention provides an improved control system for temperature regulating apparatus. The control system is low in cost, utilizes few components and is simple of operation. The system exhibits extremely stable operation and may be constructed to utilize all NTC resistors.

What is claimed is:

1. A control system for temperature regulating apparatus comprising a heater and cooler used to maintain a preselected temperature in an enclosure according to the magnitude of the control voltage applied by said control system to the apparatus, said control system including in combination, an amplifier comprising semiconductor means having a main current path and a control current path, said semiconductor means being responsive to variation of current in said control current path to vary the current in said main current path, said amplifier being responsive to the magnitude of current in said main current path to supply a control voltage which varies therewith to the temperature regulating apparatus, first temperature sensitive resistor means and variable resistor means series connected across the source of potential, means connecting the junction of said first resistor means and said variable resistor means to said control current path, a second temperature sensitive resistor series connected with said main current path across a source of potential, said second resistor being disposed exteriorly of the enclosure for varying the current in said main current path in accordance with the temperature exteriorly of the enclosure, and an air duct connected to the intake side of the regulating apparatus, said air duct having its opposite end disposed in the interior of the enclosure and drawing interior air therein, means supporting said first resistor means proximate said opposite end of said duct so that the intake of air into the apparatus causes a flow of interior air in said air duct and about said resistor means, said resistor means being responsive to the temperature of the interior air to the vary the current in said control current path of said semiconductor means thereby reducing the response time of the regulating system to control the interior temperature of the encloure.

2. A control system for temperature regulating apparatus comprising a heater and cooler used to maintain a preselected temperature in an enclosure according to the magnitude of the control voltage applied by said control system to the apparatus, said control system including in combination, control amplifier means coupled to the temperature regulating apparatus and having a main current path and a control current path, said control current path being responsive to a variation of current therein to vary the current in said main current path, said amplifier means being responsive to the magnitude of current in said main current path to supply a control voltage which varies therewith to the temperature regulating apparatus, first temperature sensitive resistor means coupled to said control current path of said amplifier means, second temperature sensitive resistor means coupled to said main current path of said amplifier means, said second resistor means being disposed exteriorly of the enclosure for varying the current in said main current path in accordance with the temperature exteriorly of the enclosure, and an air duct connected to the intake side of the regulating apparatus, said air duct having its opposite end disposed in the interior of the enclosure and drawing interior air therein, means supporting said first resistor means proximate said opposite end of said duct so that the intake of air into the apparatus causes a flow of interior air in said air duct and about said first resistor means, said first resistor means being responsive to the temperature of the interior air to vary the current in said control current path of said control amplifier means thereby reducing the response time of the regulating system to control the interior temperature of the enclosure.

References Cited

UNITED STATES PATENTS

| 1,038,402 | 9/1912 | MacPhee | 236—13 |
| 2,045,790 | 6/1936 | Midyette | 236—38 |
| 2,949,237 | 8/1960 | De Wilde | 236—78 |
| 2,954,530 | 9/1960 | Haskell. | |
| 2,975,976 | 3/1961 | Smith et al. | 236—78 |
| 3,071,676 | 1/1963 | Sandwyk. | |

FOREIGN PATENTS 935,938  9/1963  Great Britain.

EDWARD J. MICHAEL, *Primary Examiner.*

ALDEN D. STEWART, *Examiner.*